United States Patent Office 3,481,926
Patented Dec. 2, 1969

3,481,926
POLYHYDROXY STEROIDS AND PROCESSES
FOR THEIR PREPARATION
Gerhard A. Huppi, Mountain View, and John B. Siddall,
Palo Alto, Calif., assignors, by mesne assignments to,
Zoecon Corporation, Palo Alto, Calif., a corporation
of Delaware
No Drawing. Filed Sept. 8, 1967, Ser. No. 666,483
Int. Cl. C07c *173/00, 169/62, 167/20*
U.S. Cl. 260—239.55    21 Claims

ABSTRACT OF THE DISCLOSURE

Synthesis of the insect and crustacean hormone, crustecdysone, novel polyhydroxy steroids and novel intermediates for the preparation thereof.

---

The present invention relates to novel cyclopentanopolydrophenanthrene compounds and to processes for their preparation.

More particularly the invention relates to the total synthesis of the insect and crustacean steroid hormone, crustecdysone, and related compounds from known starting compounds as well as to the novel intermediate compounds useful in the synthesis thereof.

Crustecdysone is a crustacean moulting hormone which differs from the known insect hormone ecdysone by the presence of an additional hydroxy group at C-20.

The novel compounds of the present invention which are useful for the synthesis of crustecdysone and analogues thereof affect the growth of crustaceans and insects by controlling skin moults, that is, they cause ecdysis or skin shedding and stimulate maturation at all pre-adult stages of life. Thus they are useful in managing and controlling the population of crustaceans and insects. Crustecdysone and the novel compounds of the present invention which are employed in the same manner as the related known insect hormone ecdysone and which may be employed in a range of from 0.001 microgram to about 20 micrograms per insect, are represented by the following formulas:

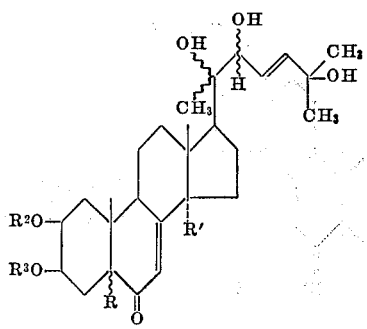

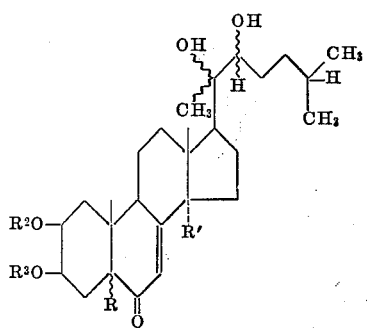

In the above formulas R represents α-hydrogen or β-hydrogen; $R^1$ represents hydrogen or hydroxy; $R^2$ and $R^3$ are each hydrogen or a hydrocarbon carboxylic acyl group of less than 12 carbon atoms, or taken together, the group

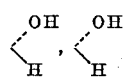

in which each of A and B is hydrogen or lower alkyl; and $R^4$ is $$\begin{array}{cc} OH & OH \\ \diagdown & , \diagdown \\ H & H \end{array}$$

or keto.

The presence of asymmetric carbons in the various positions on the above formulas permit the existence of isomeric forms. As hereinafter set forth, the processes of the present invention generate both forms as stated and these forms are readily separated from one another by the conventional methods of chromatography, fractional crystallization, and the like. The present invention embraces all such isomeric forms. The use of the wavy line, "ξ," indicates both alpha and beta configurations either singularly or collectively. With specific reference to the configuration at C-20 and C-22, the designations α and β are used in accordance with the Fischer convention.

The acyl group is derived from hydrocarbon carboxylic acids containing less than 12 carbon atoms which may be saturated or unsaturated, of straight, branched, cyclic or cyclic aliphatic chain, aromatic and may be substituted by functional groups such as hydroxy, alkoxy containing up to 5 carbon atoms, acyloxy containing up to 12 carbon atoms, nitro, amino or halogen and the like. Typical ester groups are the acetate, propionate, enanthate, benzoate, trimethylacetate, t-butylacetate, phenoxyacetate, cyclopentylpropionate, aminoacetate, β-chloropropionate, adamantoate and the like.

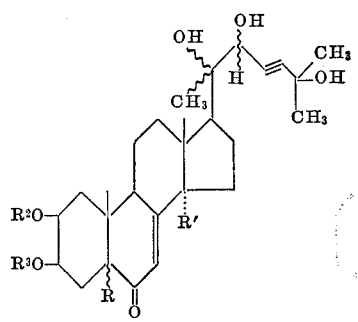

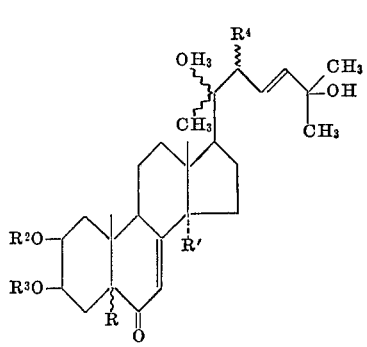

The preparation of crustecdysone and the novel compounds of the present invention may be illustrated by the following equation:
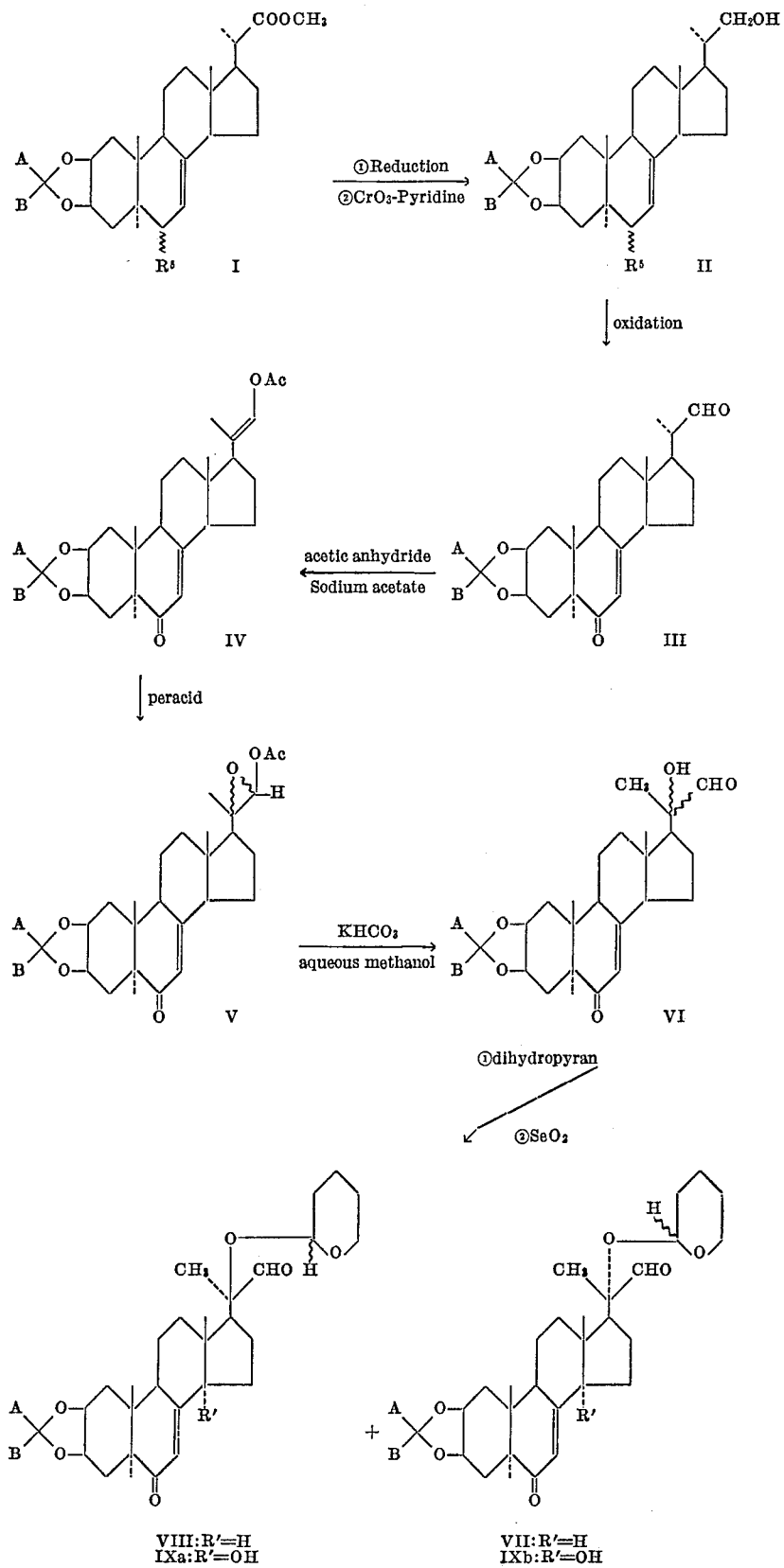

| Grignard

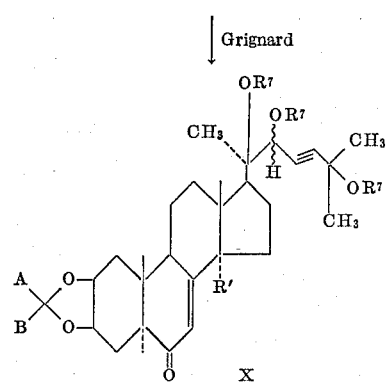

X

①K₂CO₃, aq. methanol
②Hydrogenation
③Acid

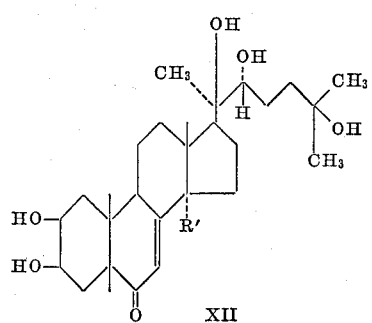

XII

+

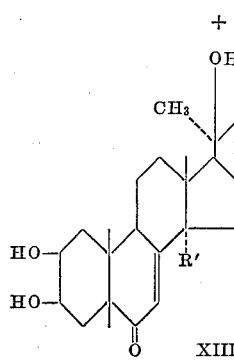

XIII

| Grignard

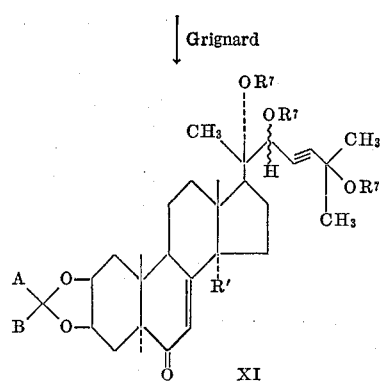

XI

①K₂CO₃, aq. methanol
②Hydrogenation
③Acid

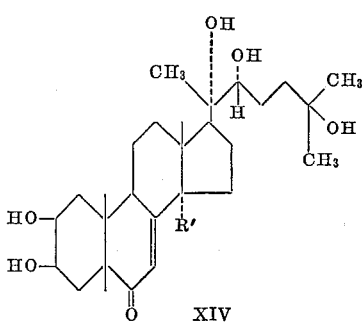

XIV

+

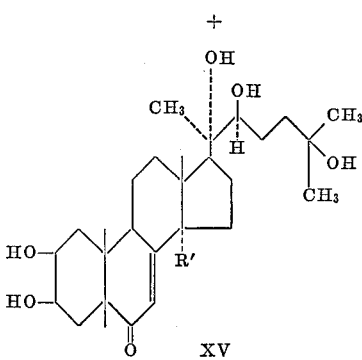

XV

In the above formulas, A and B have the same meaning as heretofore set forth, $R^5$ is keto or hydroxy and $R^7$ is the tetrahydropyran-2-yl group.

In practicing the process outlined above, the starting compound is produced from known compounds. More specifically, 2β,3β - diacetoxy - 5α - hydroxy - 6 - keto 22, 23 - bisnorchol - 7 - en - 24 - oic acid methyl ester described by Siddall et al, JACS 88, 379–380 (1966), is acetylated in the presence of an acid catalyst such as p-toluenesulfonic acid to obtain the corresponding triacetate, i.e., 2β,3β,5α - triacetoxy - 6 - keto - 22,23 - bisnorchol - 7 - en - 24 - oic acid methyl ester. The tertiary acyloxy group is removed by treatment with strongly acidic chromous chloride with the result that the thermodynamically less stable 5α-hydrogen is formed to yield the known compound 2β,3β - diacetoxy - 6 - keto - 22,23-bisnor - 5α - chol - 7 - en - 24 - oic acid methyl ester described by Kerb et al., Tetrahedron Letters (1966), 1387. Upon mild alkaline hydrolysis of the diacetate with dilute aqueous methanolic potassium carbonate there is obtained the free 2β,3β-diol, which, upon treatment with an aldehyde or ketone of the type conventionally employed in forming acetals and ketals, and particularly acetone, in the presence of p-toluenesulphonic acid yields the corresponding acetal or ketal and specifically the acetonide (I: $R^5$=keto; A=B=methyl).

Reduction of the thus formed 2β,3β-acetonide of the 2β,3β - dihydroxy - 6 - keto - 22,23 - bisnor - 5α - chol-7-en - 24 - oic acid methyl ester with an alkali metal hydride such as sodium borohydride or lithium aluminum tri-t-butoxy hydride affords a mixture of 6α and 6β-carbinols (I: $R^5$=hydroxy; A=B=methyl) with the 6β-carbinol in predominant amount. The compounds may be separated through chromatography or subjected to the next step as a mixture.

Upon further reduction of the thus formed 2β,3β-isopropylidenedioxy - 6 - hydroxy - 22,23 - bisnor - 5α-chol - 7 - en - 24 - oic acid methyl ester with an alkali metal hydride such as lithium aluminum hydride, there is obtained the C-22 alcohol, i.e., 2β,3β-isopropylidenedioxy - 6, 22-dihydroxy - bisnor - 5α-chol - 7 - ene or 2β, 3β - isopropylidenedioxy - 6 - hydroxy - 20 - hydroxymethyl pregn-7-ene (II: $R^5$=hydroxy; A=B=methyl).

Reoxidation of the diol, for example, with ice-cold chromium trioxide in pyridine, rapidly yields the unsaturated 6-keto - alcohol (II: $R^5$=keto; A=B-methyl), which, upon further oxidation with a mixed reagent comprising a dialkyl carbodiimide such as diethyl carbodiimide, a hydrocarbon sulfoxide such as dimethyl sulfoxide, a solvent such as benzene, in the presence of an acid catalyst such as pyridinium trifluoracetate, affords the 6-keto-20-aldehyde (III: A=B=methyl).

For introduction of a hydroxy group at C-20, the carbonyl function of the aldehyde is utilized for the next step which is formation of the enol acylate (IV) by reaction of the aldehyde, preferably with boiling acetic anhydride:sodium acetate. The enol acetate is then epoxidized with a peracid such as m-chloroperbenzoic acid in a solvent such as benzene to produce approximately equal amounts of two C-20,22 expoxide isomers (V). This mixture may be separated by conventional chromatographic techniques or alternatively, the process may be continued using the mixture of epoxides.

Upon treatment of the epoxides with dilute methanolic potassium carbonate under an atmosphere of nitrogen, there is obtained the stereoisomeric hydroxyaldehydes (VI). The mixture of hydroxyaldehydes are treated with dihydropyran and a catayltic amount of p-toluenesulphonic acid in dry benzene to obtain the corresponding isomeric tetrahydropyranyl ethers (VII and VIII).

Alternating, the hydroxyaldehydes (VI) are separated by conventional methods such as chromatography or fractional crystallization and pyranylated separately to each afford two diastereomeric pyranyl ethers differing only within the tetrahydropyran ring (VII and VIII).

Hydroxylation at C-14, if desired, is then effected by reacting the pyranyl ethers with selenium dioxide in an ether solvent such as dioxane to give the 14α-hydroxy form (IXa and IXb).

For introduction of the side chain at C-22, alkylation is effected either prior to or subsequent to the hydroxylation at C-14, with 3-methyl-3-tetrahydropyran - 2 - yloxy-but-1-yne in a solvent such as tetrahydrofuran at 20° C. to afford a mixture of epimeric C-22 tetrahydropyranyl ethers (X, XI).

Epimerization of the hydrogen at C-5, if desired, may be effected at this stage by treating the alkylated product with aqueous methanolic potassium carbonate.

The resulting products may be reduced to the olefinic stage or completely saturated either prior to or subsequent to the hydroxylation at C-14 or prior to or subsequent to the epimerization at C-5. Thus the product of the alkylation is catalytically reduced with Lindlar catalyst or palladium on charcoal for a period of time of the order of one-half hour to yield the corresponding 2β,3β - alkylidenedioxy - 14α - hydroxy - 20,22,25 - tri(tetrahydropyran - 2 - yloxy) - 5 - cholest - 7,23 - dien - 6-ones or 14 - desoxy compounds, which, upon further hydrogenation in the presence of palladium, are transformed into 2β,3β - alkylidenedioxy - 14α - hydroxy - 20, 22,25 - tri(tetrahydropyran - 2 - yl - oxy - ) - 5 - cholest-7-en-ones or the corresponding 15-desoxy compounds. Separation of the C-20 and C-22 isomers may be performed at this stage although this may be effected before the previous step or after the subsequent step. Treatment of the thus reduced product with an acid such as hydrochloric acid, oxalic acid or formic acid for a period of time from about thirty minutes to about two hours results in the removal of the tetrahydropyranyl groups thus regenerating hydroxy groups, while prolonging this treatment to from about 10 to 20 hours cleaves, in addition, the 2β,3β-alkylidenedioxy function thereby regenerating hydroxy groups in the 2β and 3β positions as well. There are thus formed the polyhydroxy steroids XII, XIII, XIV and XV including crustecdysone (XII: R¹=OH). Esters, if desired, may be produced by treatment with conventional acylating agents derived from hydrocarbon carboxylic acids of less than 12 carbon atoms.

While the foregoing transformations have been described in connection with the synthesis of crustecdysone and analogues thereof, they may also, with various modifications, be employed in the preparation of other valuable compounds as heretofore described. Accordingly by eliminating the epimerization of the C-5 hydrogen, there are obtained upon execution of the other steps herein described, compounds bearing the 5α-hydrogen. Similarly, elimination of the 14-hydroxylation step yields compounds bearing a 14α-hydrogen. By oxidizing the C-22 hydroxy group prior to complete reduction of the C-23, 24 bond there are obtained compounds having a 22-carbonyl group in lieu of the 22-hydroxy derivatives. Further, 25-desoxy analogs are obtainable by substituting a bromomagnesium derivative of 3-methyl-butane for the 3-methyl-3-tetrahydropyran-2-yloxy-but-1 - yne described hereinabove. Various combinations of these modifications are typified hereafter and others are apparent to those skilled in the art from the present disclosure of the invention.

The following examples serve to further typify the nature of the invention but, being presented solely for the purpose of illustration, these examples should not be construed as a limitation of the scope of this invention.

EXAMPLE I

A solution containing 5 ml. of acetic acid, 2 ml. of acetic anhydride and 450 mg. of 2β,3β-diacetoxy-5α-hydroxy-6-keto-22,23-bisnorchol-7-en - 24 - oic acid methyl ester and 100 mg. of p-toluenesulfonic acid is stirred at room temperature for 3.5 hours and then added cautiously to dilute aqueous potassium bicarbonate and subjected to extraction with methylene chloride. The methylene chloride extracts are thereafter washed with water and saturated sodium chloride solution and concentrated to dryness under vacuum, yielding 2β,3β,5α-triacetoxy-6-keto-22,23-bisnorchol-7-en-24-oic acid methyl ester, M.P. 184.5°–185° C., [α]$_D$ +58°.

To a solution of 90 mg. of 2β,3β,5α-triacetoxy-6-keto-22,23-bisnorchol-7-en-24-oic acid methyl ester and 5 ml. of acetone is added 4 ml. of a 25% solution of chromous chloride in 1 N hydrochloric acid. The solution is allowed to stand for two minutes, whereupon it is poured into a water:methylene chloride mixture. The organic layer is separated and washed successively with dilute aqueous potassium bicarbonate, water, and saturated sodium chloride solution, dried over sodium sulfate, and concentrated to dryness, thus yielding 2β,3β-diacetoxy-6-keto-22,23-bisnor-5α-chol-7-en-24-oic acid methyl ester, described by A. Fustenmeier et al., Helv. Chim. Acta 49, 1591 (1966).

EXAMPLE II

A mixture of 2β,3β-diacetoxy-6-keto-22,23-bisnor-5α-chol-7-en-24-oic acid methyl ester, 0.33 g. potassium carbonate, and 100 ml. of 90% aqueous methanol is allowed to stand for approximately one hour at room temperature. Thereafter, ethyl acetate and saturated sodium chloride solution are added to the mixture and the layers are separated. The organic layer is neutralized, washed with water, dried over sodium sulfate and concentrated to dryness at room temperature to yield 2β,3β-dihydroxy-6-keto-22,23-bisnor-5α-chol-7-en-24-oic acid methyl ester.

EXAMPLE III

A mixture containing 7.14 g. of 2β,3β-dihydroxy-6-keto-22,23-bisnor-5α-chol-7-en-24-oic acid methyl ester, 100 ml. of acetone, and 66 mg. of p-toluenesulfonic acid is stirred at room temperature for approximately 1 hour. The reaction mixture is thereafter poured into cold, saturated aqueous potassium bicarbonate solution, water is then added and the mixture is filtered, dried over sodium sulfate and evaporated to dryness to yield 7.42 g. of 2β,3β-isopropylidenedioxy-6-keto-22,23-bisnor-5α-chol - 7 - en-24-oic acid methyl ester. The product was recrystallized from acetone:methylene dichloride to afford 5.49 g. of pure product, M.P. 255–257°; [α]$_D$ +19°; λ$_{max}$ 244 mμ (ε 12,780).

Analysis.—Calcd. for $C_{26}H_{38}O_5$: C, 72.52; H, 8.90; O, 18.58. Found: C, 72.85; H, 8.80; O, 18.53.

EXAMPLE IV

A mixture of 5 g. of 2β,3β-isopropylidenedioxy-6-keto-22,23-bisnor-5α-chol-7-en-24-oic acid methyl ester and 300 ml. of anhydrous tetrahydrofuran are heated to reflux. To the mixture there is added 5.2 g. of lithium aluminum tri(t-butoxy)hydride and the mixture is stirred at reflux for about forty minutes. The reaction mixture is cooled, 5.2 ml. of acetic acid is added and then extracted with methylene dichloride and water. The extracts are concentrated to dryness under vacuum to yield 2β,3β-isopropylidenedioxy-6-hydroxy - 23,24-bisnor-5α-chol-7-en-22-oic acid methyl ester which may be separated into the 6α and 6β isomers by fractional crystallization and silica chromatography. By recrystallization from methylene chloride, ether and hexane there were obtained 3.15 g. of 2β,3β-isopropylidenedioxy - 6β - hydroxy-22,23-bisnor-5α-chol-7-en-24-oic acid methyl ester, M.P. 214–216°; [α]$_D$ —6.5°; N.M.R. 67.5 (19-H), 105 (OH), 220–250 C.P.S. mult. (6α-H).

Analysis.—Calcd. for $C_{26}H_{40}O_5$: C, 72.19; H, 9.32; O, 18.49. Found: C, 72.43; H, 9.13; O, 18.34.

EXAMPLE V

A solution of 2 g. of 2β,3β-isopropylidenedioxy-6β-hydroxy-22,23-bisnor-5α-chol-7-en-24-oic acid methyl ester in 50 ml. of tetrahydrofuran is added over a 30-minute period to a stirred suspension of 200 mg. of lithium aluminum hydride in 20 ml. of tetrahydrofuran, maintaining a temperature of about 20° C. The mixture is stirred for 45 minutes and at the end of this time, the excess reagent is destroyed through the addition of 40 ml. of ethyl acetate followed by 28 ml. of water. After stirring for an additional 30 minutes, the mixture is filtered through Celite and the filtrate evaporated to dryness. The white solid is crystallized from methylene dichloride:hexane to give 1.51 g. of 2β,3β-isopropylidenedioxy-6β-hydroxxy-20α-hydroxymethyl-pregn-7-ene, M.P. 242–244°, [α]$_D$ —21°.

Analysis.—Calcd. for $C_{25}H_{40}O_4$: C, 74.21; H, 9.97; O, 15.82. Found: C, 74.41; H, 10.09; O, 15.66.

EXAMPLE VI

A mixture of 10.6 g. of 2β,3β-isopropylidenedioxy-6β-hydroxy-20α-hydroxymethyl-pregn-7-ene in 254 ml. pyridine at ice temperature is added to 8.5 mg. chromium trioxide in 130 ml. pyridine at ice temperature and stirred at ice temperature for 2 hours. Thereafter 100 ml. of methylene dichloride is added with Celite, the mixture is filtered, extratced with water, then ether until the color is removed, dried and concentrated to obtain 10 g. of 2β,3β-isopropylidenedioxy - 6-keto-20α-hydroxymethyl-pregn-7-ene, M.P. 258–260°; [α]$_D$ +10°; λ$_{max}$ 245 mμ (ε 13, 160).

Analysis.—Calcd. for $C_{25}H_{38}O_4$: C, 74.59; H, 9.52; O, 15.90. Found: C, 74.54; H, 9.66; O, 16.02.

EXAMPLE VII

A solution of 150 g. sodium carbonate, 224 g. of sodium chloride, 1 l. of water is added to 132 g. diethylurea in 600 ml. methylene dichloride with stirring at a temperature below 27°. While the temperature is maintained below 30° with ice cooling, 14 g. of cupric chloride is added. After stirring the mixture at room temperature for 4 hours, the reaction mixture is filtered and separated. The organic layer is washed with 200 ml. water, the aqueous layer is then washed three times with 200 ml. of methylene dichloride. The organic material is dried over sodium sulfate, concentrated under vacuum pressure. A fraction amounting to 50 g. of diethylcarbodiimide boiling at 90–91 at 250 mm. is collected, diluted with 100 ml. dry benzene and the total volume of 152 ml. is stored at room temperature.

A mixture of 8 g. of 2β,3β-isopropylidenedioxy-20α-hydroxymethyl-pregn-7-en-6-one, 300 ml. of dimethyl sulfoxide, 12.5 ml. of pyridine and 2.5 ml. of trifluoroacetic acid is treated with 29.8 ml. of the diethylcarbodiimide-benzene mixture. After 5 hours, an additional 20 ml. of diethylcarbodiimide-benzene is added. After 11 hours an additional 1 ml. of trifluoroacetic acid in 5 ml. of pyridine are added and the mixture is allowed to stand for one and one-half hours. The solid which precipitated is filtered and washed with methanol. There is obtained 5.95 g. of 2β,3β-isopropylidenedioxy-6-keto-20α-formyl-pregn-7-ene, M.P. 250–252°; [α]$_D$ +8° λ$_{max}$ 244 mμ (ε 13, 840), N.M.R. 39.5 (18-H), 69 doublet, $J$ 6. 5 (21-H), 577 doublet, $J$ 6 c.p.s. (20-CHO).

Analysis.—Calcd. for $C_{25}H_{36}O_4$: C, 74.96; H, 9.06; O, 15.98. Found: C, 74.93; H, 8.93; O, 16.11.

EXAMPLE VIII

A mixture of 244 mg. of 2β,3β-isopropylidenedioxy-6-keto-20α-formyl-pregn-7-ene dissolved in 25 ml. of acetic anhydride to which 440 mg. of sodium acetate is added is refluxed for 4 hours under an atmosphere of nitrogen. The mixture is then diluted with water, washed with ice cold aqueous potassium bicarbonate and water. The solvent is evaporated and the acetic anhydride removed with benzene. The residue is chromatographed to give 135 mg. of the enol acetate, M.P. 185–189°: ν$_{max}$ 1760, 1675, 1625 cm.$^{-1}$; N.M.R. 100 mc. 1.71 (21-H), 2.12 (OAc), 6.8 p.p.m. (22-H).

Analysis.—Calcd. for $C_{27}H_{38}O_5$: C, 73.27; H, 8.65. Found: C, 73.31; H, 8.90.

EXAMPLE IX

A mixture of 120 mg. of the enol acetate produced in the preceding example in 10 ml. of benzene is treated with 40 mg. of m-chloroperbenzoic acid. The mixture is allowed to stand overnight, and then is washed with 2% sodium hydroxide, then with water, sodium sulfite solution and again with water. The reaction mixture is then evaporated to dryness and the residue chromatographed to obtain 108 mg. of a crystalline mixture of two C–20 isomeric epoxides in approximately equal amounts, M.P. 190–205°; N.M.R. 100 mc. 0.70, 0.80 (18-H), 1.50, 1.55 (21-H), 2.09, 2.11 p.p.m. (OAc).

Analysis.—Calcd. for $C_{27}H_{38}O_6$: C, 70.11; H, 8.35. Found: C, 70.23; H, 7.96.

EXAMPLE X

A solution containing 100 mg. of the epoxides obtained in Example IX dissolved in 40 ml. of a solution of potassium bicarbonate prepared from 165 mg. of potassium bicarbonate in 20 ml. of water and 180 ml. of methanol, was stirred at room temperature under nitrogen for one and one quarter hours. The reaction mixture was diluted with methylene dichloride and washed with water until the washings were neutral. The solution is then concentrated to yield 90 mg. of a mixture of isomers which is separated by thin layer chromatography to yield 2β,3β-isopropylidenedioxy - 6 - keto - 20β-hydroxy-20-formyl-pregn-7-ene, M.P. 228–231°; N.M.R. 100 mc. 0.69 (18-H), 1.36 (21-H), 9.61 p.p.m. (CHO).

Analysis.—Calcd. for $C_{25}H_{36}O_5$: C, 72.08; H, 8.71. Found: C, 71.53; H, 8.87 and 2β,3β-isopropylidenedioxy-6-keto-20α-hydroxy-20-formyl-pregn-7-ene, M.P. 234–237°; N.M.R. mc. 100 0.62 (18-H), 1.27 (21-H), 9.62 p.p.m. (CHO).

Analysis.—Calcd. for $C_{25}H_{36}O_5$: C, 72.08; H, 8.71. Found: C, 72.13; H, 9.03.

EXAMPLE XI 270 mg. of 2β,3β-isopropylidenedioxy-6-keto-20α-hydroxy-20-formyl-pregn-7-ene is dissolved in 67 ml. of benzene. After distilling off 30 ml. of benzene, 0.68 ml. of dihydropyran and 12.8 ml. of a solution of 50 mg. of p-toluenesulfonic acid in 60 ml. benzene are added. The mixture is allowed to stand for 3 hours, then washed with saturated potassium bicarbonate solution, water and dried over sodium sulfate. Evaporation under reduced pressure affords a mixture which is resolved by chromatography to yield two diastereomeric pyranyl ethers of 2β,3β - isopropylidenedioxy - 6-keto-20β-tetrahydropyran-(2) - yloxy - 20 - formyl - pregn - 7 - ene differing only within the tetrahydropyran ring, one isomer having a M.P. 211.5–215°; N.M.R. (mc. 100) 0.85 (18-H), 1.04

(19-H), 1.34 (21-H), 4.65 (OCHO), 5.73 (7-H), 9.83 p.p.m. (CHO).

*Analysis.*—Calcd. for $C_{30}H_{46}O_6$: C, 71.97; H, 8.86. Found: C, 71.27; H, 8.86 M.S. 500 (M+), 287, 329, 85, and the other isomer having a M.P. 181–183°, N.M.R. (mc. 100) 0.80 (18-H), 1.03 (19-H), 1.40 (21-H), 4.75 (CHO), 5.74 (7-H), 9.72 p.p.m. (CHO).

*Analysis.*—Calcd. for $C_{30}H_{46}O_6$: C, 71.97; H, 8.86. Found: C, 71.97; H, 8.86. M.S. 500 (M+), 387, 329, 85.

EXAMPLE XII 210 mg. of 2β,3β-isopropylidenedioxy-6-keto-20β-hydroxy-20-formyl-pregn-7-en is dissolved in 52 ml. of benzene. After 25 ml. of benzene is distilled off, 0.68 ml. of dihydropropyran and 10 ml. of a solution of 50 mg. of p-toluenesulfonic acid in 60 ml. benzene is added. The mixture is allowed to stand for 3 hours and is then worked up in the same manner as described in Example XI.

The mixture of isomers is resolved by thin layer chromatography to yield two diasteromeric pyranyl ethers of 2β,3β - isopropylidenedioxy - 6 - keto - 20β - hydroxy-20-formyl-pregn-7-ene, differing only in the pyranyl ring with one having a M.P. 229–233°; N.M.R. (mc. 100) 0.70 (18-H), 1.02 (19-H), 1.33 (21-H), 4.65 (OCHO), 5.71 (7-H), 9.73 p.p.m. (CHO).

*Analysis.*—Calcd. for $C_{30}H_{46}O_6$: C, 71.97; H, 8.86. Found: C, 72.14; H, 8.72. M.S. 500 (M+), 387, 329, 85, and the other having a M.P. 225–228°; N.M.R. (mc. 100) 0.70 (18-H), 1.03 (19-H), 1.44 (21-H), 4.69 (OCHO), 5.72 (7-H), 9.75 p.p.m. (CHO).

*Analysis.*—Calcd. for $C_{30}H_{46}O_6$: C, 71.97; H, 8.86. Found: C, 72.08; H, 8.84. M.S. 500 (M+) 387, 329, 85.

EXAMPLE XIII

A mixture containing 120 mg. of 2β,3β-isopropylidenedioxy - 6 - keto - 20α - tetrahydropyranyloxy-20-formyl-pregn-7-ene (the first isomer produced in Example XI), 17 ml. of dioxane and 45 mg. of selenium dioxide was stirred for two hours at 55°. The reaction mixture is poured into dilute aqueous potassium bicarbonate and extracted with ethyl acetate. The extracts are washed with saturated sodium chloride solution until neutral, dried and filtered through Celite diatomaceous earth. The filtrate is concentrated to dryness, affording 105 mg. of the 14α-hydroxy derivative M.P. 226–230°; N.M.R. (mc. 100) 0.94 (18-H), 1.04 (19-H), 1.36 (21-H), 4.66 (OCHO), 5.89 (7-H), 9.86 p.p.m. (CHO).

*Analysis.*—Calcd. for $C_{30}H_{46}O_7$: C, 69.74; H, 8.58. Found: C, 69.90; H, 8.35.

EXAMPLE XIV

A mixture containing 25 mg. of selenium dioxide, 8 ml. of dioxane and 56 mg. of 2β,3β-isopropylidenedioxy-6 - keto - 20α - tetrahydropyran-2-yloxy-pregn-7-en (the second isomer produced in Example XI), was treated in the same manner as set forth in Example XII to afford the corresponding 14α-hydroxy derivative, N.M.R. (mc. 100) 0.86 (18-H), 1.02 (19-H), 1.43 (21-H), 4.76 (OCHO), 5.92 (7-H), 9.66 p.p.m. (CHO).

EXAMPLE XV 110 mg. of a mixture of the pyranyl ethers produced in Example XII, 40 mg. of selenium dioxide and 15 ml. of dioxane were maintained at 55° for 2 hours. The reaction mixture was worked up as in Example XIII, affording 106 mg. of 2β,3β-isopropylidenedioxy-6-keto-14α-hydroxy - 20β - tetrahydropyranyloxy-20-formyl-pregn-7-ene. M.P. 230–234°; N.M.R. (mc. 100) 0.77 (18-H), 1.02 (19-H), 1.36 (21-H), 4.66 (OCHO), 5.88 (7-H), 9.75 p.p.m. (CHO).

*Analysis.*—Calcd. for $C_{30}H_{44}O_7$: C, 69.74; H, 8.58. Found: C, 69.85; H, 8.18.

EXAMPLE XVI

To 0.9 ml. 3-methyl-3-tetrahydropyran-2-yloxy-but-1-yne in 25 ml. tetrahydrofuran is added 1.3 ml. of a 3 N solution of methyl magnesium bromide in tetrahydrofuran under nitrogen and the mixture is stirred overnight at room temperature.

To 40 mg. of the product of Example XV dissolved in 3 ml. of tetrahydrofuran, there is added at ice temperature under nitrogen, 2.5 ml. of the Grignard reagent as prepared above. The reaction mixture is stirred for four and one-half hours at room temperature and then diluted with ethyl acetate, washed with an aqueous solution of potassium sodium tartrate, then with water to neutral and concentrated to dryness. Chromatography yielded 20 mg. of 2β,3β - isopropylidenedioxy-14α-hydroxy - 20α,22,25 - tri(tetrahydropyran - 2 - yloxy)-5α-cholest-7-en-23-yn-6-one which upon further purification is separated into the 22β isomer, N.M.R. (mc. 100) 0.80 (18-H), 1.03 (19-H), 1.45 (21-H), 1.49, 1.57 (26-H, 27-H), 4.39 (22-H), 5.16 (OCHO), 5.92 p.p.m. (7-H). The 22α isomer is isolated similarly but in lesser quantity.

EXAMPLE XVII

To 16 mg. of the product of Example XVI dissolved in 0.4 ml. of tetrahydrofuran there is added 2 ml. of 0.33% potassium carbonate in 10% aqueous methanol and the reaction mixture is stirred overnight under nitrogen. The reaction mixture is then extracted with ethyl acetate, washed with water, dried over sodium sulfate and evaporated to dryness. By chromatography with ethyl acetate:hexane, there is obtained 10 mg. of the 5β isomer and 6 mg. of the starting 5α isomer. The recovered starting material is again equilibrated to yield an additional 4 mg. of the 5β isomer with recovery of 2 mg. of the 5α isomer.

EXAMPLE XVIII

A mixture containing 14 mg. of 2β,3β-isopropylidenedioxy - 14α - hydroxy - 20α,22,25 - tri(tetrahydropyran-2-yloxy)-5α-cholest-7-en-23-yn-6-one, 9 ml. of N/20 HCl in 10% aqueous tetrahydrofuran is allowed to stand at room temperature for about three hours. The reaction mixture is then washed to neutrality with potassium bicarbonate and extracted with ethyl acetate. The combined ethyl acetate extracts are washed with water, dried over sodium sulfate, and concentrated to dryness to yield 2β,3β, 14α,20α,22,25 - hexahydroxy - 5α - cholest - 7 - en-23-yn-6-one, which are separated into the 22α and 22β isomers by silica chromatography.

Similarly, by substituting the 5β isomers of Example XVII in the above procedure, there are obtained the corresponding 2β,3β,14α,20α,22α,25 - hexahydroxy - 5β-cholest-7-en-23-yn-6-one and 2β,3β,14α,20α,22β,25-hexahydroxy-5β-cholest-7-en-23-yn-6-one.

EXAMPLE XIX

In the same manner as described in Example XVI, 50 mg. of the product of Example XIII dissolved in 3 ml. tetrahydrofuran is reacted with 2.5 ml. of the Grignard reagent as prepared in Example XVI. The reaction mixture is washed with water, extracted with ethyl acetate, dried and evaporated to dryness. By chromatography the product was identified as 2β,3β-isopropylidenedioxy-14α-hydroxy - 20β,22,25 - tri(tetrahydropyran - 2 - yloxy)-5α-cholest-7-en-23-yn-6-one, N.M.R. (mc. 100) 0.88 (18-H), 1.04 (19-H), 1.37, 1.38, 1.57 (21-H, 26-H, 27-H), 5.11 (OCHO), 5.92 p.p.m. (7-H). The C–22α and C–22β forms may be separated via chromatography over silica or may be used as a mixture of the two.

Without further purification, the crude product is dissolved in 0.5 ml. tetrahydrofuran to which is added 2 ml. of 0.33% potassium carbonate in 10% aqueous methanol. The mixture is kept overnight under nitrogen with stirring.

The mixture is then taken up in ethyl acetate:hexane and chromatographed to yield 29 mg. of the 5β isomer and 15 mg. of the starting 5β isomer. The latter is recycled to yield an additional 10 mg. of the 5β isomer with 5 mg. of the 5β isomer recovered.

EXAMPLE XX

A solution of 39 mg. of the 5β isomer produced in Example XIX in 10 ml. of ethanol is hydrogenated for one hour in the presence of 40 mg. of 5% poisoned palladium-on-calcium carbonate catalyst. At the end of this time, the reaction mixture is filtered and the filtrate evaporated to yield 35 mg. of crude 2β,3β-isopropylidenedioxy - 14α - hydroxy - 20β,22,25 - tri(tetrahydropyran-2-yloxy)-5β-cholest-7,23-dien-6-one. The 22α and 22β forms may be separated by chromatography over silica gel in ethyl acetate-hexane system.

The foregoing mixture is stirred for nine hours with 3 ml. of N/20 HCl in 10% aqueous tetrahydrofuran. The reaction mixture is then washed with aqueous saturated sodium chloride solution until neutral. The reaction mixture is then taken up in methanol:chloroform and chromatographed to yield 2β,3β,14α,20β,22α,25-hexahydroxy-5β-cholest-7,23-dien-6-one and 2β,3β,14α,20β,22β,25-hexahydroxy-5β-cholest-7,23-dien-6-one.

In a similar fashion the 5α isomer of Example XIX is transformed into the corresponding 5α derivatives.

By substituting the product of Example XVI in the above described method, there are obtained 2β,3β-isopropylidenedioxy - 14α - hydroxy - 20α,22,25 - tri(tetrahydropyran-2-yloxy)-5α-cholest-7,23-dien-6-one and subsequently 2β,3β,14α,20α,22,25 - hexahydroxy-5α-cholest-7,23-dien-6-one which can be separated into the 22α and 22β isomers.

EXAMPLE XXI

By following the procedure of Example XVII the 2β,3β - isopropylidenedioxy - 14α - hydroxy - 20α,22α,25 - tri (tetrahydropropyran - 2 - yloxy-) - 5α - cholest - 7 - en - 23-yn-6-one and 2β,3β-isopropylidenedioxy-14α-hydroxy-20α,22β,25 - tri(tetrahydropyran - 2 - yloxy-) - 5α - cholest - 7-en-23-yn-6-one and the corresponding 5β isomers produced in Example XIX are transformed into the free hexahydroxy compounds, namely, 2β,3β,14α,20α,22α,25-hexahydroxy-5α-cholest-7-en-23-yn-6-one; 2β,3β,14α,20α,22β,25-hexahydroxy-5α-cholest-7-en-23-yn-6-one and the corresponding 5β isomers.

In a similar fashion, the 2β,3β-isopropylidenedioxy-14α-hydroxy - 20α,22,25 - tri(tetrahydropyran - 2 - yloxy)-5α-cholest-7,23-dien-6-one and the 5β isomer produced in Example XX are transformed into the free hexahydroxy compounds.

EXAMPLE XXII 14 mg. of the crude product produced in Example XVII dissolved in 10 ml. of ethanol is hydrogenated in the presence of 16 mg. of 5% poisoned palladium-on-calcium carbonate catalyst for one half hour. At the end of this time, the catalyst is filtered off to yield, after work up as set forth in Example XX, 15 mg. of 2β,3β-isopropylidenedioxy - 14α - hydroxy - 20α,22,25 - tri(tetrahydropyran-2-yloxy)-5β-cholest-7,23-dien-6-one which can be separated by silica chromatography into the C–22α and C–22β isomers.

The crude material dissolved in 15 ml. of ethanol is hydrogenated for three hours in the presence of 40 mg. of 5% palladium-on-charcoal catalyst and worked up as set forth in Example XX, except that the product is stirred for 5 hours with 5 ml. of N/10 hydrochloric acid in 10% aqueous tetrahydrofuran to afford 14 mg. of 2β,3β,14α,20α,22β,25-hexahydroxy - 5β - cholest-7-en-6-one (ecdysterone) N.M.R. (mc. 100) 1.07 (19-H), 1.20 (18-H), 1.36 (26-H, 27-H), 1.56 (21-H), 6.17 (7-H), and 2β,3β,14α,20α,22α,25-hexahydroxy-5β-cholest-7-en-6-one.

EXAMPLE XXIII

By subjecting the products of Example XI to the method of Example XVI there are obtained the diastereoisomers of 2β,3β-isopropylidenedioxy-20β,22(α and β),25-tri(tetrahydropyran - 2 - yloxy) - 5α - cholest-7-en-23-yn-6-one differing only in the 20-tetrahydropyranyl ring. The mixture of isomers is then treated with acid as set forth in Example XVIII to yield the free pentahydroxy compounds 2β,3β,20β,22(α and β),25 - pentahydroxy - 5α-cholest-7-en-23-yn-6-one. By further reaction with methanolic potassium carbonate as set forth in Example XVII there are obtained the corresponding 5β-isomers. The 22α and 22β forms may be separated via chromatography over silica eluting 1:1 hexane:acetone.

EXAMPLE XXIV

Similarly the products of Example XII are subjected to the method of Example XVI to yield the diastereoisomers of 2β,3β - isopropylidenedioxy-20α,22(α and β),25-tri(tetrahydropyran-2-yloxy) - 5α - cholest-7-en-yn-6-one which upon treatment with acid as set forth in Example XVIII are transformed in the free pentahydroxy compounds 2β,3β,20α,22(α and β),25 - pentahydroxy - 5α-cholest-7-en-23-yn-6-one. By treating the thus formed product according to the method of Example XVII, there are obtained the corresponding 5β isomers.

EXAMPLE XXV

By hydrogenating 2β,3β,20β,22,25 - pentahydroxy - 5α-cholest-7-en-23-yn-6-one of Example XXIII according to the method of Example XXII, there are first obtained 2β,3β,20β,22(α and β),25 - pentahydroxy-5α-cholest-7,23-dien-20-one and then 2β,3β,20β,22α,25-pentahydroxy-5α-cholest-7-en-6-one and 2β,3β,20β,22β,25-pentahydroxy-5α-cholest-7-en-6-one.

In a similar fashion, the 5β isomers of Example XXIII are transformed successively into the corresponding 5β isomers.

EXAMPLE XXVI

By substituting 2β,3β,20α,22(α and β),25-pentahydroxy-5α - cholest - 7 - en - 22 - yne - 6 - one and 2β,3β, 20α, 22(α and β),25 - pentahydroxy-5β-cholest-7-en-22-yne-6-one in the method of Example XXII there are obtained the corresponding 2β,3β,20α,22(α and β),25 - pentahydroxy - 5α - cholest-7,23-dien-20-ones; 2β,3β,20α,22(α and β),25-pentahydroxy-5α-cholest-7-en-20-ones and the corresponding 5β isomers.

EXAMPLE XXVII

By hydrogenating the 2β,3β,14α,20α,22,25-hexahydroxy-5α-cholest-7-en-23-yn-6-one of Example XVIII by the method of Example XX, there are obtained 2β,3β,14α,20α,22,25-hexahydroxy-5α-cholest-7,23-dien-6-ones which can be separated into the C–22α and C–22β isomers. Upon further hydrogenation there are obtained 2β,3β,14α,20α,22α,25-hexahydroxy-5α-cholest-7-en-6-one and 2β,3β,14α,20α,22β,25-hexahydroxy-5α-cholest-7-en-6-one.

EXAMPLE XXVIII

By substituting 2β,3β,14α,20α,22(α and β),25-hexahydroxy-5α-cholest-7-en-23-yne-6-ones of Example XXI in the method of Example XXVII, there are obtained the corresponding 2β,3β,14α,20α,22(α and β),25 - hexahydroxy-5α-cholest-7,23-dien-6-ones and then 2β,3β,14α,20α,22α, 25-hexahydroxy-5α-cholest-7-en-6-one and 2β,3β,14α,20α, 22β,25-hexahydroxy - 5α - cholest-7-en-6-one, identical to those produced in Example XX.

Similarly, the 5β isomers produced in Example XXI are converted into the corresponding 5β isomers, identical with those produced in Example XX.

EXAMPLE XXIX 20 mg. of 2β,3β-isopropylidenedioxy-14α-hydroxy-20α, 22β,25-tri(tetrahydropyran - 2 - yloxy) - 5β - cholest-7,23-dien-6-one prepared in Example XXII, is treated with 20 ml. of N/40 HCl in 10% aqueous tetrahydrofuran for 2 hours. The mixture is diluted with tetrahydrofuran, washed neutral with a saturated aqueous solution of sodium chloride and concentrated to dryness to yield 2β,3β-isopropylidenedioxy - 14α,20α,22β,25 - tetrahydroxy-5β-cholest-7,23-dien-6-one.

In a similar manner, 2β,3β - isopropylidenedioxy - 14α-hydroxy - 20α,22,25 - tri(tetrahydropyran - 2 - yloxy)-5α-cholest-7-en-23-yne-6-one, the 5β-isomers and 20β isomer thereof prepared in Examples XVI, XVII and XIX are transformed into the corresponding 2β,3β-isopropylidenedioxy - 14α,20,22,25 - tetrahydroxy-5-cholest-7-en-23-yne-6-one compounds.

EXAMPLE XXX

A mixture of 10 mg. of 2β,3β-isopropylidenedioxy-14α, 20α,22β,25 - tetrahydroxy-5β-cholest-7,23-dien-6-one prepared in Example XXIX, in 1 ml. of chloroform and 0.01 of isopropanol is stirred under nitrogen with 100 mg. of active manganese dioxide for six hours. At the end of this time, the manganese dioxide is removed by centrifugation and the resultant supernatant is evaporated to yield 2β,3β - isopropylidenedioxy - 14α,20α,25 - trihydroxy-5β-cholest-7,23-dien-6,22-dione.

EXAMPLE XXXI

By substituting 2β,3β - isopropylidenedioxy-20α,22β,25-trihydroxy - 5β - cholest - en - 7,23-dien-6-one in Example XXX, there is obtained 2β,3β-isopropylidenedioxy-20α,25-dihydroxy-5β-cholest-7,23-dien-6,22-dione.

EXAMPLE XXXII

By following the procedure of Examples XXIX and XXX, except that 2β,3β - isopropylidenedioxy - 14α - hydroxy-20α,22β,25-tri (tetrahydropyran - 2 - yloxy) - 5α-cholest17,23 - dien - 6 - one prepared in Example XXI is substituted therein, there are obtained 2β,3β-isopropylidenedioxy-14α,20α,25 - trihydroxy-5α-cholest-7,23 - dien-6,22-dione and 2β,3β,14α,20α,25-pentahydroxy-5α-cholest-7,23-dien-6,22-dione.

EXAMPLE XXXIII

By substituting the bromo-magnesio derivative of 3-methyl butane in the method of Example XVI, there is obtained 2β,3β-isopropylidenedioxy-14α,22 - dihydroxy-20α-tetrahydropyran-2-yloxy-5α-cholest-7-en-6-one.

By subjecting the product to the method of Example XVIII, there is obtained the 2β,3β,14α,20α,22β-pentahydroxy-5α-cholest-7-en-6-one which is converted into the 5β-isomer by the method of Example XVII.

Similarly, by employing the above method to the product of Examples XI, XII and XIII, there are obtained the corresponding 25-desoxy derivatives.

EXAMPLE XXXIV

A solution containing 25 mg. of 2β,3β,14α,20α,22β,25-hexahydroxy-5β-cholest-7-en-23-yne - 6 - one in 1 ml. of pyridine is treated with 0.1 ml. of acetic anhydride at 5° C. and allowed to stand for 4 hours. The reaction mixture is then evaporated under vacuum. Silica chromatography of the product affords 2β,3β-diacetoxy-14α,20α,22β,-25-tetrahydroxy-5β - cholest-7-en-23-yne-6-one in addition to the 2β-monoacetate and 3β-monoacetate and a lesser amount of 2β,3β-22β-triacetate.

In a similar manner the free polyhydroxy compounds of Examples XX–XXVIII and XXXII are converted in the corresponding acetates.

By substituting propionic anhydride, and cyclopentylpropionic anhydride for the acetic anhydride, there are obtained the corresponding propionates and cyclopentylpropionates.

What is claimed is:
1. Compounds of the formula:

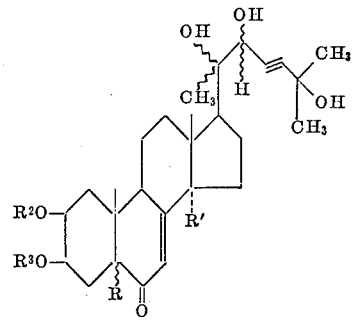

wherein
R is α-hydrogen or β-hydrogen.
R¹ is hydrogen or hydroxy; and
R² and R³ are each hydrogen or a hydrocarbon carboxylic acyl group of less than 12 carbon atoms, or taken together, the group

in which each of A and B is hydrogen or lower alkyl.

2. A compound according to claim 1 wherein each of R² and R³ is hydrogen, R¹ is α-hydroxy and R is as therein defined.

3. A compound according to claim 2 wherein R is β-hydrogen.

4. A compound according to claim 2 wherein R is α-hydrogen.

5. The compound according to claim 1, 2β,3β,14α,20α,-22β,25-hexahydroxy-5β-cholest-7-en-23-yn-6-one.

6. Compounds of the formula:

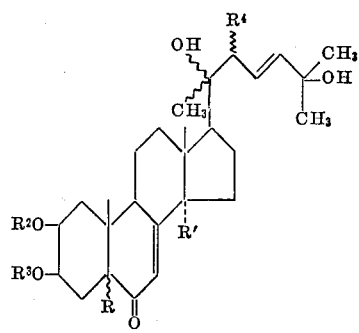

wherein R is α-hydrogen or β-hydrogen; R¹ is hydrogen or hydroxy; R² and R³ are each hydrogen or a hydrocarbon carboxylic acyl group of less than 12 carbon atoms, and R⁴ is keto,

or

7. A compound according to claim 6 wherein R¹ is hydroxy; each of R² and R³ is hydrogen; R⁴ is

and R is as defined therein.

8. A compound according to claim 7 wherein R is β-hydrogen.

9. The compound according to claim 6, 2β,3β,14α,20α,-25-pentahydroxy-5β-cholest-7,23-dien-6,22-dione.

10. Compounds of the formula:

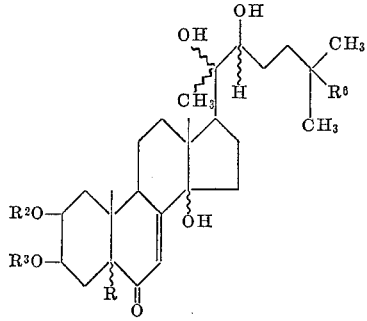

wherein R is α-hydrogen or β-hydrogen; $R^2$ and $R^3$ are each hydrogen or a hydrocarbon carboxylic acyl group of less than 12 carbon atoms, or taken together, the group

in which each of A and B is hydrogen or lower alkyl; and $R^6$ is hydrogen or hydroxy.

11. A compound according to claim 10 wherein R is β-hydrogen, each of $R^2$ and $R^3$ is hydrogen and $R^6$ is hydroxy.

12. A compound according to claim 10 wherein R is β-hydrogen and each of $R^2$, $R^3$ and $R^6$ is hydrogen.

13. Compounds of the formula:

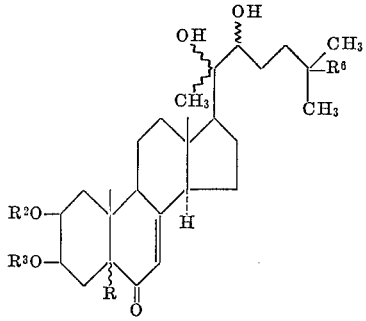

wherein R is α-hydrogen or β-hydrogen; $R^2$ and $R^3$ are each hydrogen or a hydrocarbon carboxylic acyl group of less than 12 carbon atoms, or taken together, the group

in which each of A and B is a hydrogen or lower alkyl; and $R^6$ is hydrogen or hydroxy.

14. A compound according to claim 13 wherein each of $R^2$ and $R^3$ is hydrogen, $R^6$ is hydroxy and R is as therein defined.

15. A compound according to claim 14 wherein R is β-hydrogen.

16. A compound according to claim 13 wherein R is β-hydrogen and each of $R^2$, $R^3$ and $R^6$ is hydrogen.

17. The compound according to claim 13; 2β,3β,20α,22β,25-pentahydroxy-5β-cholest-7-en-6-one.

18. The compound according to claim 13; 2β,3β,20α,22β-tetrahydroxy-5β-cholest-7-en-6-one.

19. Compounds of the formula:

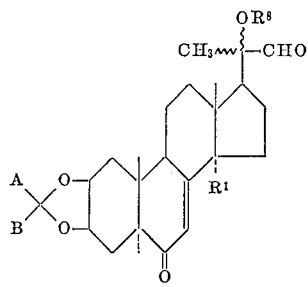

wherein each of A and B is hydrogen or lower alkyl, $R^1$ is hydrogen or hydroxy and $R^8$ is hydrogen or tetrahydropyran-2-yl.

20. The process of producing a 20,22,25-tri(tetrahydropyran-2-yloxy)-cholest-7-en-6-one which comprises reacting a 20 - tetrahydropyran - 2-yloxy-2-yloxy-20-formyl-pregn - 7-en-6-one with 3-methyl-3-tetrahydropyran-2-yloxy-but-1-yne magnesium bromide.

21. The process of claim 20 wherein a compound of the following formula:

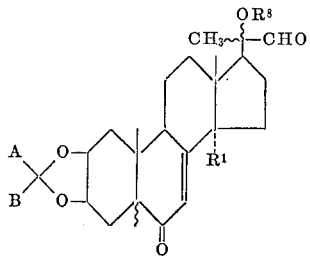

in which each of A and B is hydrogen or lower alkyl; $R^1$ is hydrogen or hydroxy and $R^8$ is tetrahydropyran-2-yl is reacted to produce a compound of the following formula:

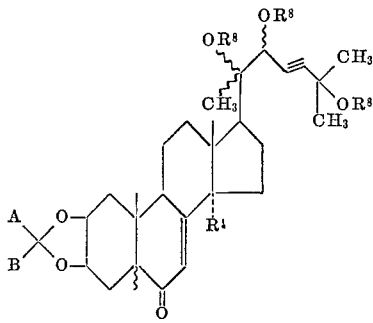

wherein A, B, $R^1$ and $R^8$ are as previously defined.

References Cited

UNITED STATES PATENTS 3,354,152  11/1967  Edwards et al. _____ 260—239.55

ELBERT L. ROBERTS, Primary Examiner

U.S. Cl. X.R.

260—397.2, 999

UNITED STATES PATENT OFFICE
CERTIFICATE OF CORRECTION

Patent No. 3,481,926    Dated December 2, 1969

Inventor(s) Gerhard A. Huppi et al

It is certified that error appears in the above-identified patent and that said Letters Patent are hereby corrected as shown below:

(1) Col. 1, line 45; Col. 1, line 60; Col. 2, line 5; and Col. 2, line 20: In each formula the substituent "R'" should read
-- $R^1$ --   (four occurrences).

(2) Col. 1, line 60: the substituent "$OH_3$" should read
-- OH -- .

(3) Col. 2, lines 1 to 15, that portion of the formula reading

" 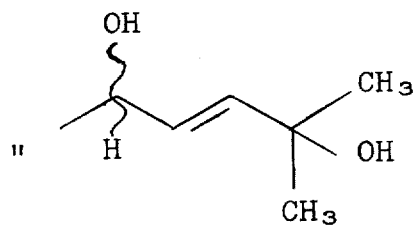 "   should read --   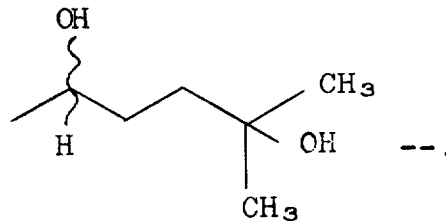   --.

(4) Col. 2, lines 43 to 46, that portion reading:

" 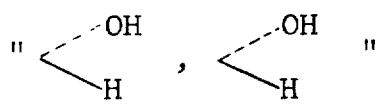 "   should read --      --.

Page 1

UNITED STATES PATENT OFFICE
CERTIFICATE OF CORRECTION

Patent No. 3,481,926 (continued)    Dated  December 2, 1969

Inventor(s)    Gerhard A. Huppi et al

It is certified that error appears in the above-identified patent and that said Letters Patent are hereby corrected as shown below:

(5) Col. 6, in formula XV, that portion reading

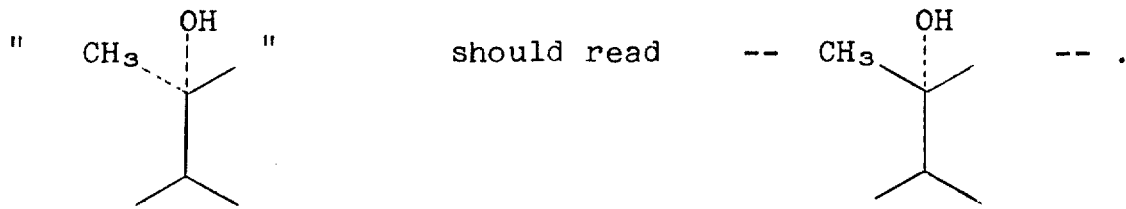

(6) Col. 11, line 4, "287" should read -- 387 -- .

(7) Col. 15, line 38, "cholest 17,23" should read -- cholest-7,23 -- .

(8) Col. 16, lines 3 to 15 and 41 to 55, that portion of the formulae reading "R'" should read -- $R^1$ -- .

(9) Col. 16, lines 65 to 68, the group:

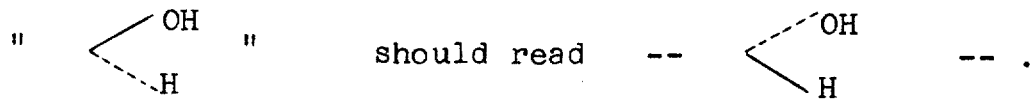

Page 2

UNITED STATES PATENT OFFICE
CERTIFICATE OF CORRECTION

Patent No. 3,481,926 (continued)   Dated December 2, 1969

Inventor(s) Gerhard A. Huppi et al

It is certified that error appears in the above-identified patent and that said Letters Patent are hereby corrected as shown below:

(10) Col. 17, lines 5 to 18, the formula should appear as shown below instead of as in the patent:

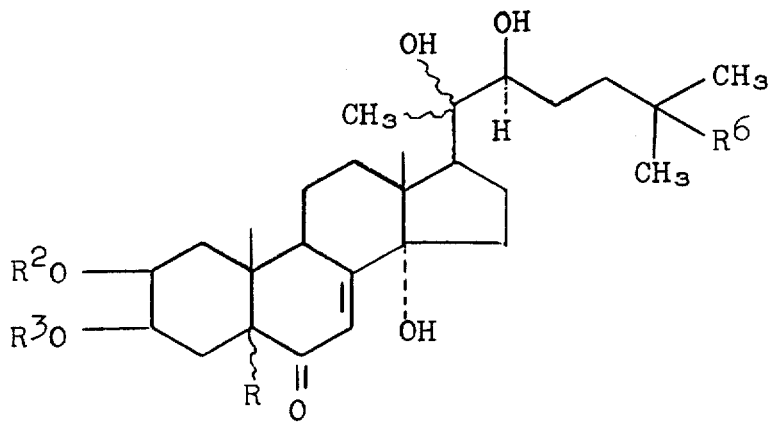

(11) Col. 18, line 21, "7-en-6-one" should read -- 7-en-23-yn-6-one -- .

(12) Col. 18, line 22, delete "2-yloxy-", first occurrence.

(13) Col. 18, lines 27 to 38 and 43 to 56, that portion of the formulae reading:

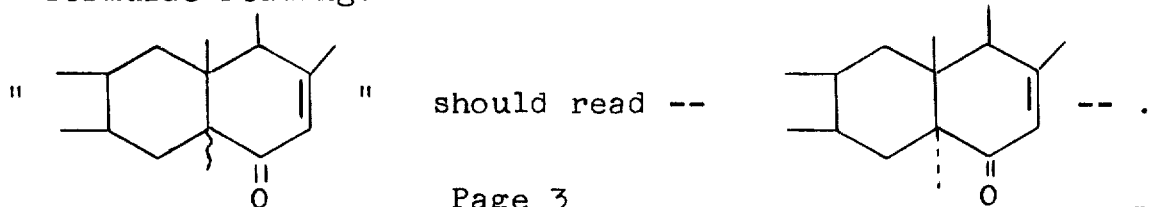

Page 3

SIGNED AND SEALED
NOV 17 1970

(SEAL)
Attest:

Edward M. Fletcher, Jr.
Attesting Officer

WILLIAM E. SCHUYLER, JR.
Commissioner of Patents

Notice of Adverse Decisions in Interferences

In Interference No. 97,236 involving Patent No. 3,481,926, G. A. Huppi and J. B. Siddall, POLYHYDROXY STEROIDS AND PROCESSES FOR THEIR PREPARATION, final judgment adverse to the patentee was rendered Sept. 25, 1972, as to claim 11.

[*Official Gazette March 27, 1973.*]